(12) United States Patent
Lai

(10) Patent No.: US 8,403,202 B1
(45) Date of Patent: Mar. 26, 2013

(54) METHOD FOR SOLDERING SURFACE MOUNTING LED TO CIRCUIT BOARD

(75) Inventor: Chih-Chen Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/550,564

(22) Filed: Jul. 16, 2012

(30) Foreign Application Priority Data

Mar. 30, 2012 (TW) .................................. 101111499

(51) Int. Cl.
*B23K 31/02* (2006.01)
(52) U.S. Cl. .................... 228/180.22; 228/215; 228/228; 228/248.1
(58) Field of Classification Search .................. None
See application file for complete search history.

(56) References Cited

U.S. PATENT DOCUMENTS

| | | | | |
|---|---|---|---|---|
| 4,109,269 | A * | 8/1978 | Hatch | 257/82 |
| 5,780,321 | A * | 7/1998 | Shieh et al. | 438/34 |
| 6,998,280 | B2 * | 2/2006 | Hsu | 438/26 |
| 7,456,438 | B2 * | 11/2008 | Lee et al. | 257/99 |
| 7,781,323 | B2 * | 8/2010 | Shimokawa et al. | 438/612 |
| 7,854,365 | B2 * | 12/2010 | Li et al. | 228/180.21 |
| 2004/0182914 | A1* | 9/2004 | Venugopalan | 228/215 |
| 2005/0087866 | A1* | 4/2005 | Shei et al. | 257/738 |
| 2006/0084191 | A1* | 4/2006 | Hwan | 438/17 |
| 2009/0061550 | A1* | 3/2009 | Kim et al. | 438/27 |
| 2009/0137073 | A1* | 5/2009 | Park et al. | 438/27 |
| 2009/0298278 | A1* | 12/2009 | Tu et al. | 438/616 |
| 2011/0037079 | A1* | 2/2011 | Lee | 257/88 |
| 2012/0025258 | A1* | 2/2012 | Chan et al. | 257/99 |
| 2012/0175660 | A1* | 7/2012 | Namiki et al. | 257/98 |
| 2012/0187428 | A1* | 7/2012 | Leising | 257/88 |
| 2012/0200786 | A1* | 8/2012 | Kamata | 348/790 |
| 2012/0217496 | A1* | 8/2012 | Tischler et al. | 257/43 |
| 2012/0248495 | A1* | 10/2012 | Umakoshi et al. | 257/99 |
| 2013/0001618 | A1* | 1/2013 | Imai et al. | 257/98 |

FOREIGN PATENT DOCUMENTS

JP 07-058149 A * 3/1995

* cited by examiner

*Primary Examiner* — Kiley Stoner
(74) *Attorney, Agent, or Firm* — Altis Law Group, Inc.

(57) ABSTRACT

A method for soldering an LED to a circuit board includes firstly providing a solder-applying pattern overlaying the circuit board. First holes and second holes are defined in the solder-applying patter. Then, solder pastes are filled in the first holes and the second holes. The solder-applying pattern is removed and a plurality of first solder poles and second solder poles are remained on the circuit board. An LED is then put on the first solder poles and the second solder poles. The first solder poles and the second solder poles are heated to form a first solder ball and a second solder ball respectively after the heated first and second solder poles are cooled. The first and second solder balls electrically connect positive and second electrodes of the LED with the circuit board.

11 Claims, 8 Drawing Sheets

METHOD FOR SOLDERING SURFACE MOUNTING LED TO CIRCUIT BOARD

BACKGROUND

1. Technical Field

The disclosure generally relates to a method for soldering an LED (light emitting diode) to a circuit board, and particularly to a method for soldering an LED to a circuit board by surface mounting technology (SMT).

2. Description of Related Art

In recent years, due to excellent light quality and high luminous efficiency, LEDs have increasingly been used as substitutes for incandescent bulbs, compact fluorescent lamps and fluorescent tubes as light sources of illumination devices.

Generally, surface mounting LEDs are more and more popular. To solder the surfacing mounting LEDs to a circuit board, solder pastes are used, which are deposited on predetermined regions of the circuit board in advance; then the LEDs are positioned on the solder pastes. Thereafter the solder pastes are heated to melt by a reflow process to electrically and mechanically connect the LEDs with the circuit board after the melted pastes are cooled to become solder balls. However, since each solder paste is a single solder block if during the reflow process heat is unevenly applied to the solder pastes, the melting degrees of the solder pastes will be different from each other. When this happens, due to different cohesions, the solder balls obtained from the melted solder pastes after they are cooled will have different shapes and heights. The different cohesions during the melted solder pastes cooled into solder balls may also be caused by different qualities of printing in applying the solder pastes onto the circuit board. The different heights of the solder balls will cause an unsatisfied electrical and mechanical connection between the LEDs and the circuit board, which may unfavorably affect a light output of the LEDs and useful life of the LEDs.

What is needed, therefore, is a method for soldering a surface mounting LED to a circuit board to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments of soldering a surface mounting LED to a circuit board will now be described in detail below and with reference to the drawings.

Figure 1:
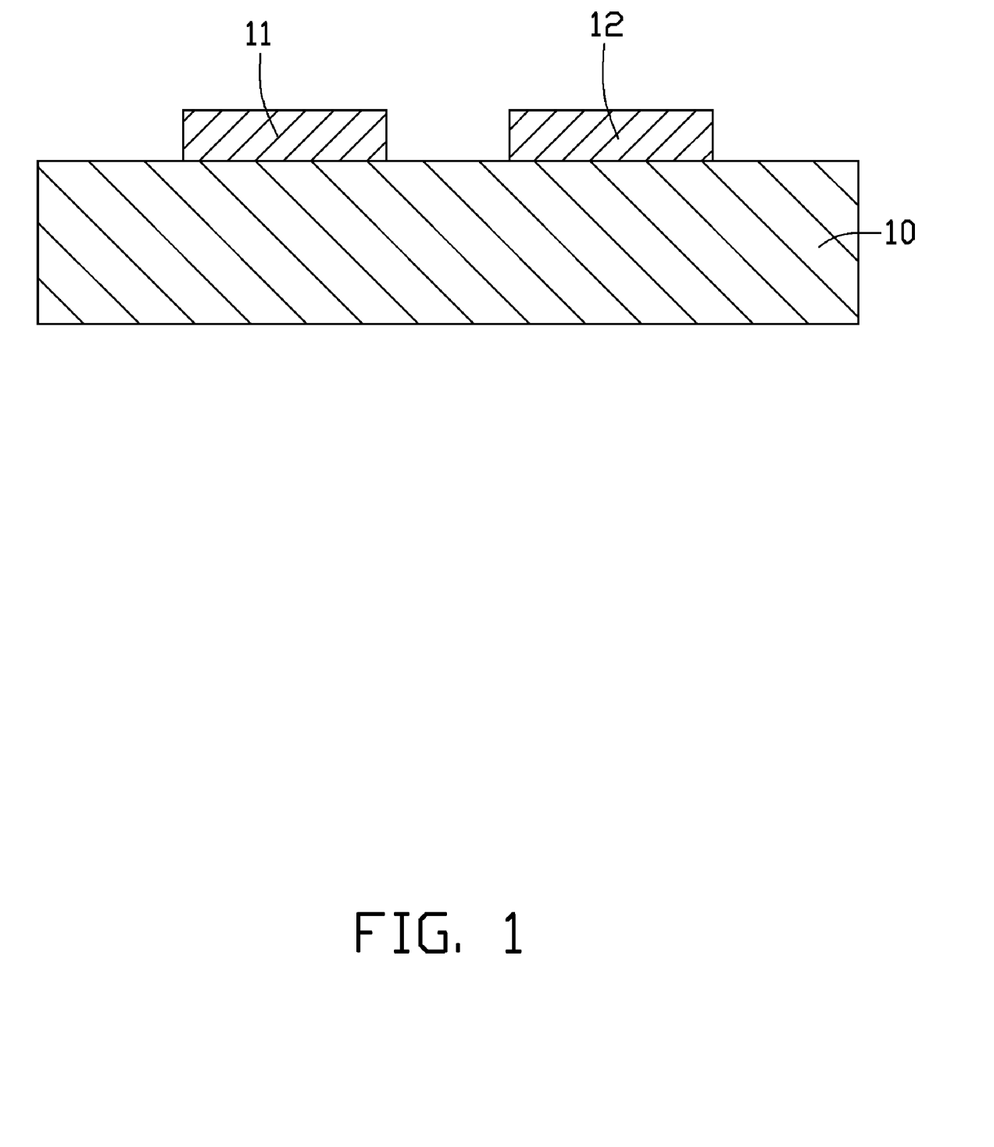
FIG. 1 is a cross-sectional view showing a step of providing a circuit board in accordance with a first embodiment of the present disclosure.

Referring to FIG. 1, a circuit board 10 is firstly provided. The circuit board 10 includes a first electrode 11 and a second electrode 12 formed on an upper surface thereof. The first electrode 11 and the second electrode 12 are electrically insulated from each other.

Figure 2:
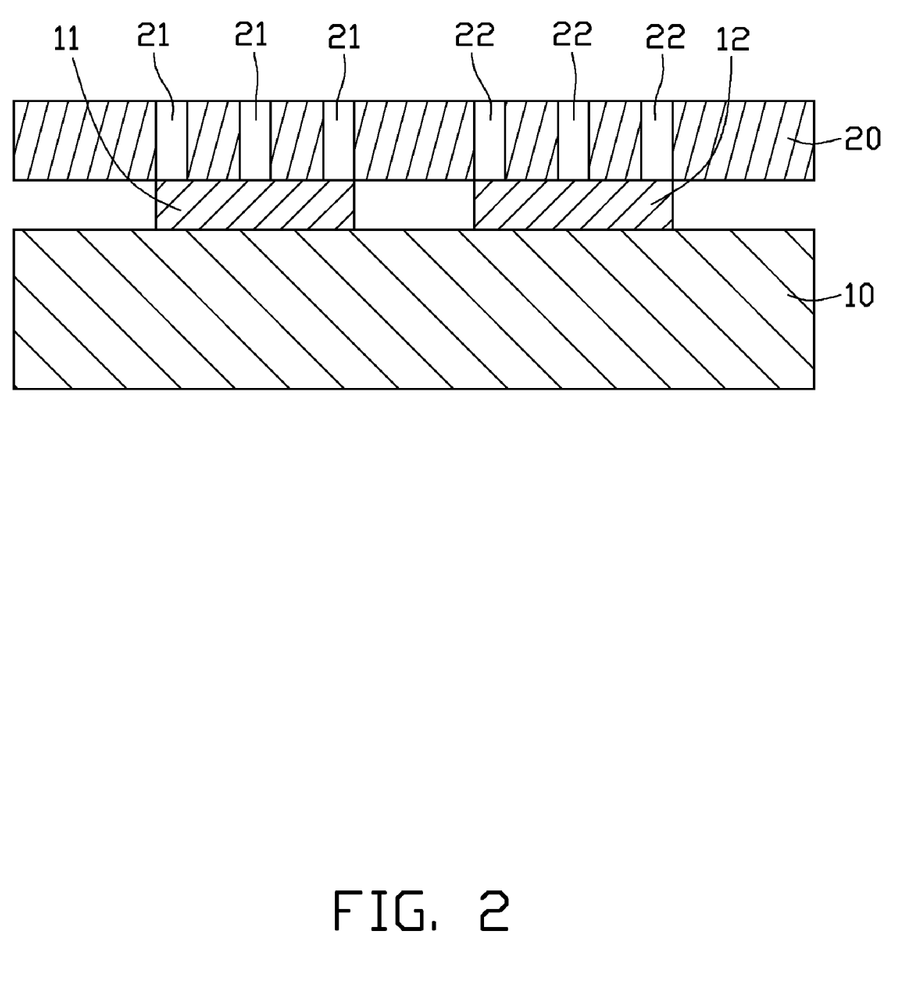
FIG. 2 is a cross-sectional view showing a step of positioning a solder-applying pattern on the circuit board of FIG. 1.
Figure 3:
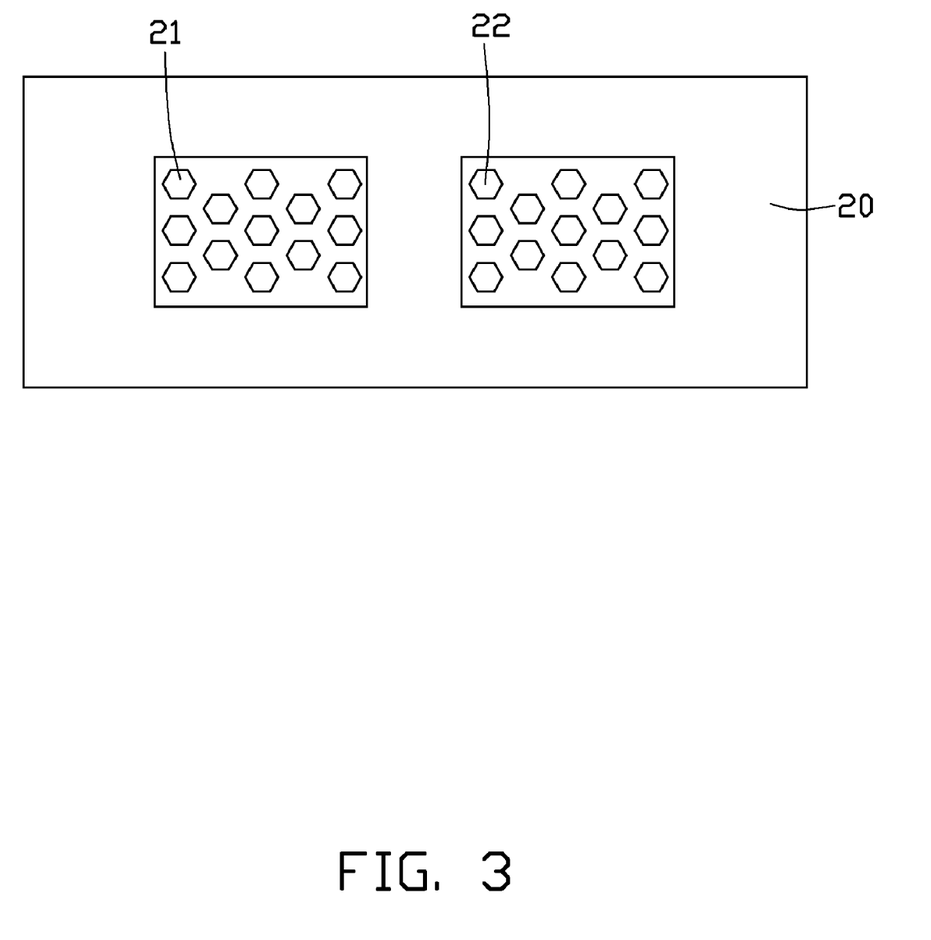
FIG. 3 is a top view showing the solder-applying pattern of FIG. 2.

Referring to FIG. 2, a solder-applying pattern 20 is provided to overlay the first electrode 11 and the second electrode 12 of the circuit board 10. The solder-applying pattern 20 defines a plurality of first holes 21 above the first electrode 11 and a plurality of second holes 22 above the second electrode 12. The first holes 21 and the second holes 22 extend through the solder-applying pattern 20 from an upper surface to a bottom surface thereof, thereby exposing parts of the first electrode 11 and parts of the second electrode 12. In this embodiment, the solder-applying pattern 20 is made of steel, and the first holes 21 and the second holes 22 are formed in the solder-applying pattern 10 by etching, laser cutting or punching. The first through holes 21 are hexagonal prism-shaped and cooperatively arranged in a honeycomb structure, as shown in FIG. 3. The second through holes 22 are also hexagonal prism-shaped and cooperatively arranged in a honeycomb structure.

Figure 4:
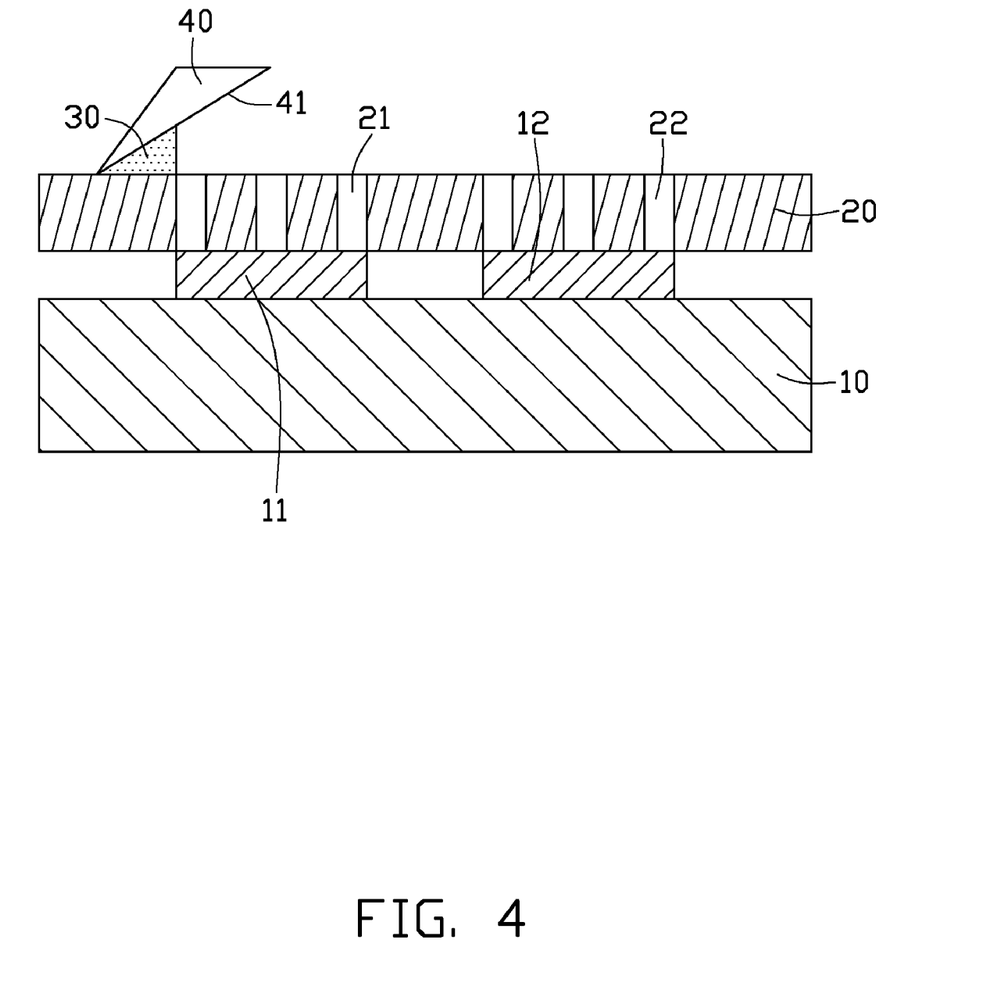
FIG. 4 is a cross-sectional view showing a step to apply solder pastes on the circuit board through holes in the solder-applying pattern of FIG. 2.

Referring to FIG. 4, solder pastes 30 are deposited on the upper surface of the solder-applying pattern 20. A squeegee blade 40 is provided to move along the upper surface of the solder-applying pattern 20 and push the solder pastes 30 to fill into the first holes 21 and the second holes 22. The solder pastes 30 may be any suitable configuration, such as tin or lead solder particles held together within a flux paste. The squeegee blade 40 can be made of a relatively flexible material. In this embodiment, the squeegee blade 40 is made of plastic. The squeegee blade 40 has a bottom surface 41. When the squeegee blade 40 moves along the upper surface of the solder-applying pattern 20, the bottom surface 41 of the squeegee blade 40 forms an acute angle with the upper surface of the solder-applying pattern 20, thereby to push the solder pastes 30 into the first holes 21 and the second holes 22 more smoothly. Preferably, the acute angle between the bottom surface 41 of the squeegee blade 40 and the upper surface of the solder-applying pattern 20 is in a range from 15 to 75 degrees. Therefore, when the squeegee blade 40 reaches the first holes 21 and the second holes 22, the squeegee blade 40 can provide a downward force to press the solder pastes 30 into the first holes 21 and the second holes 22.

Figure 5:
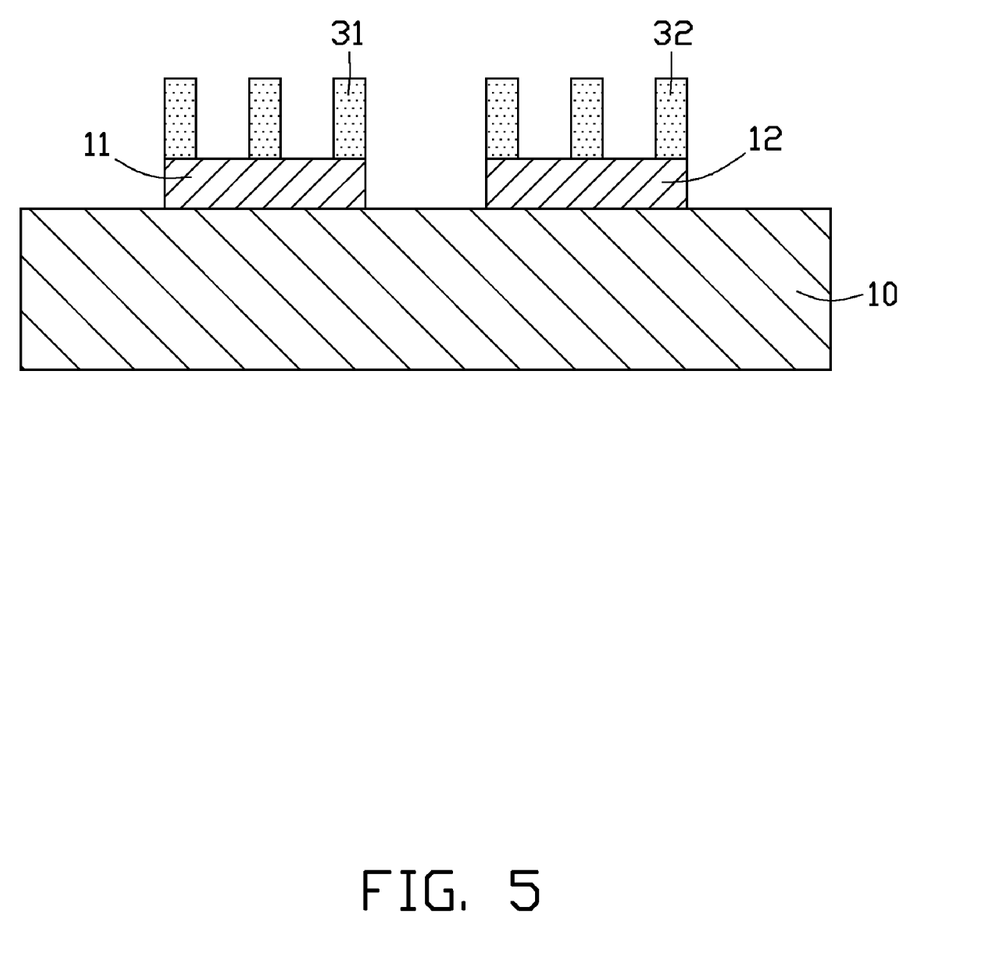
FIG. 5 is a cross-sectional view showing a step wherein the solder-applying pattern of FIG. 4 is removed and soldering poles are formed on the circuit board.

Referring to FIG. 5, the solder-applying pattern 20 is removed from the circuit board 10. The solder paste 30 filled in the first holes 21 remains on the upper surface of the circuit board 10 and forms a plurality of first soldering poles 31 on the first electrode 11. The solder paste 30 filled in the second holes 22 remains on the upper surface of the circuit board 10 and forms a plurality of second soldering poles 32 on the second electrode 12.

Figure 6:
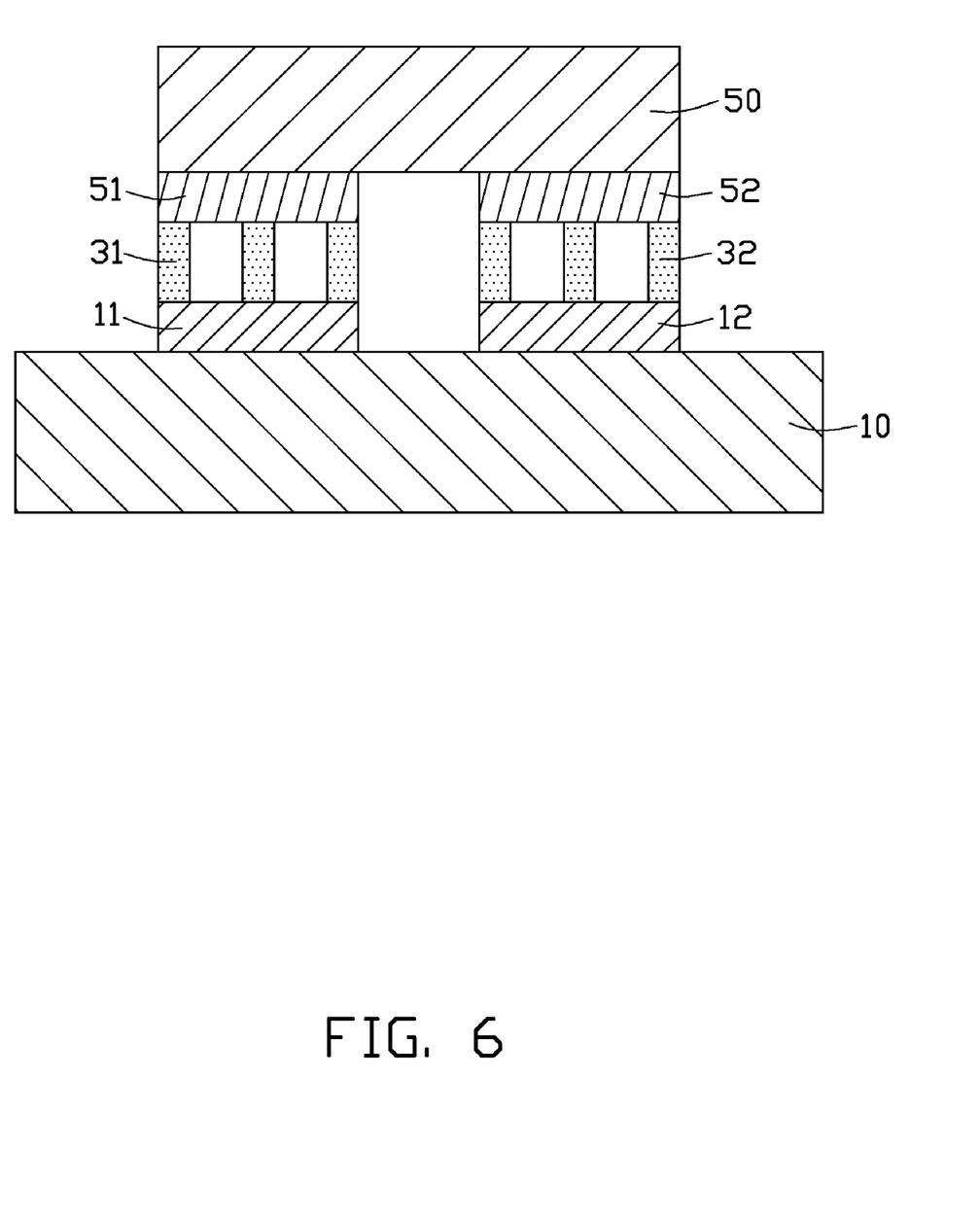
FIG. 6 is a cross-sectional view showing a step of depositing an LED on the soldering poles of FIG. 5.

Referring to FIG. 6, an LED 50 is placed on the first soldering poles 31 and the second soldering poles 32. The LED 50 includes a positive electrode 51 and a negative electrode 52 formed at a bottom side thereof. The positive electrode 51 and the negative electrode 52 are located on the first soldering poles 31 and the second soldering poles 32 of the circuit board 10 respectively.

Figure 7:
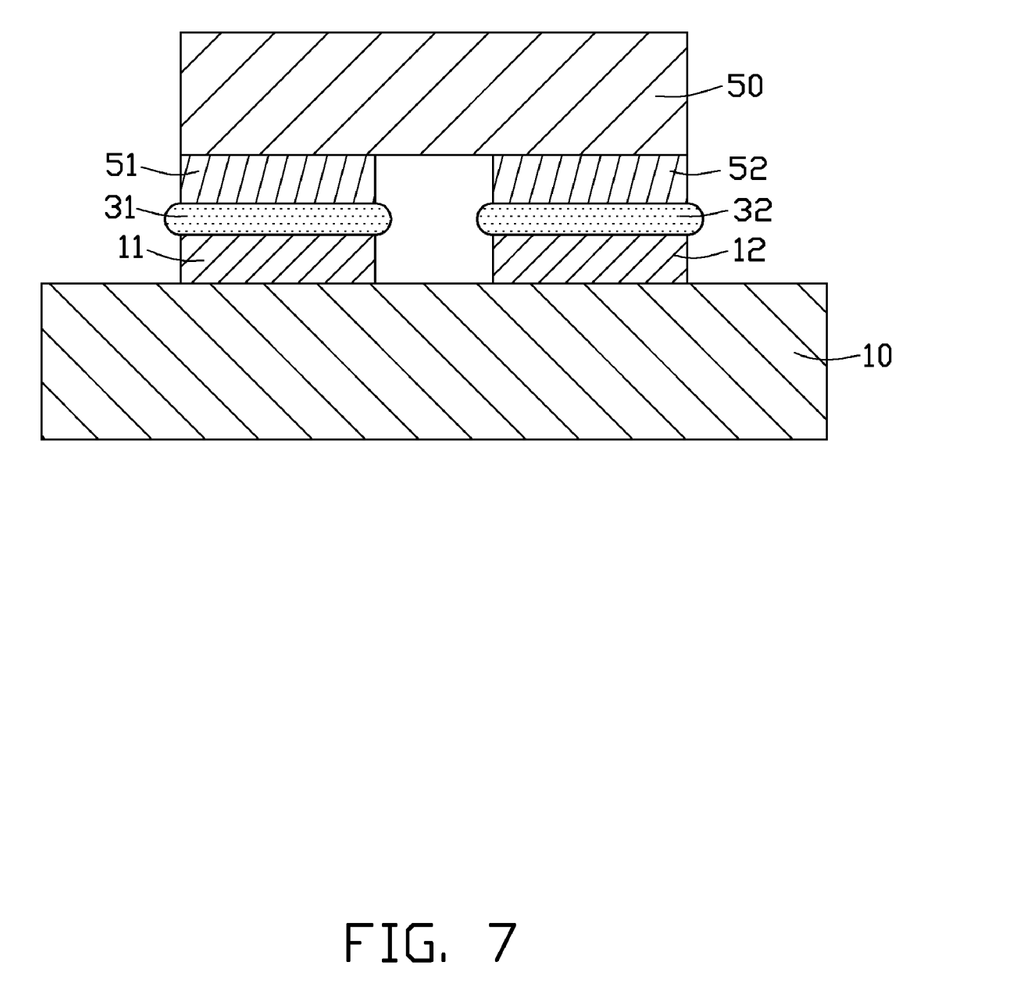
FIG. 7 is a cross-sectional view showing a step of melting the soldering poles of FIG. 6 to form solder balls which electrically and mechanically connect the LED and the circuit board together after the melted soldering poles are cooled.

Referring to FIG. 7, the first soldering poles 31 are heated to melt to form a first solder ball 33 after the melted first soldering poles 31 are cooled, so that the positive electrode 51 of the LED 50 is electrically connected with the first electrode 11 by the first solder ball 33. The second soldering poles 32 are heated to melt to form a second solder ball 34 after the melted second soldering poles 32 are cooled, so that the negative electrode 52 of the LED 50 is electrically connected with the second electrode 12 by the second solder ball 34.

In the method described above, by forming a plurality of the first holes 21 and a plurality of the second holes 22 in the solder-applying pattern 20, the first solder ball 33 is consisted of a plurality of evenly distributed first soldering poles 31 melted and combined together and the second solder ball 34 is consisted of a plurality of evenly distributed second soldering poles 32 melted and combined together. By such design, even if during reflow of the circuit board 10 there is an uneven heat applied to the circuit board 10 or if the printing qualities for applying the solder pastes 30 to the circuit board to form the soldering poles 31, 32 are not uniform, the soldering poles 31, 32 can still be uniformly melted and cooled with uniform cohesions to from the solder balls 33, 34. Thus, the first solder ball 33 formed by the first solder poles 31 will have substantially the same shape and size as those of the second solder ball 34 formed by the second solder poles 32. Therefore, the electrical and mechanical connection between the LED 50 and the circuit board 10 is reliable, and a light output of the LED 50 is normal. In addition, the first holes 21 and the second holes 22 are hexagonal prism-shaped and cooperatively arranged in a honeycomb structure. Therefore, the soldering pastes 30 can be filled into the first holes 21 and the second holes 22 more uniformly.

Figure 8:
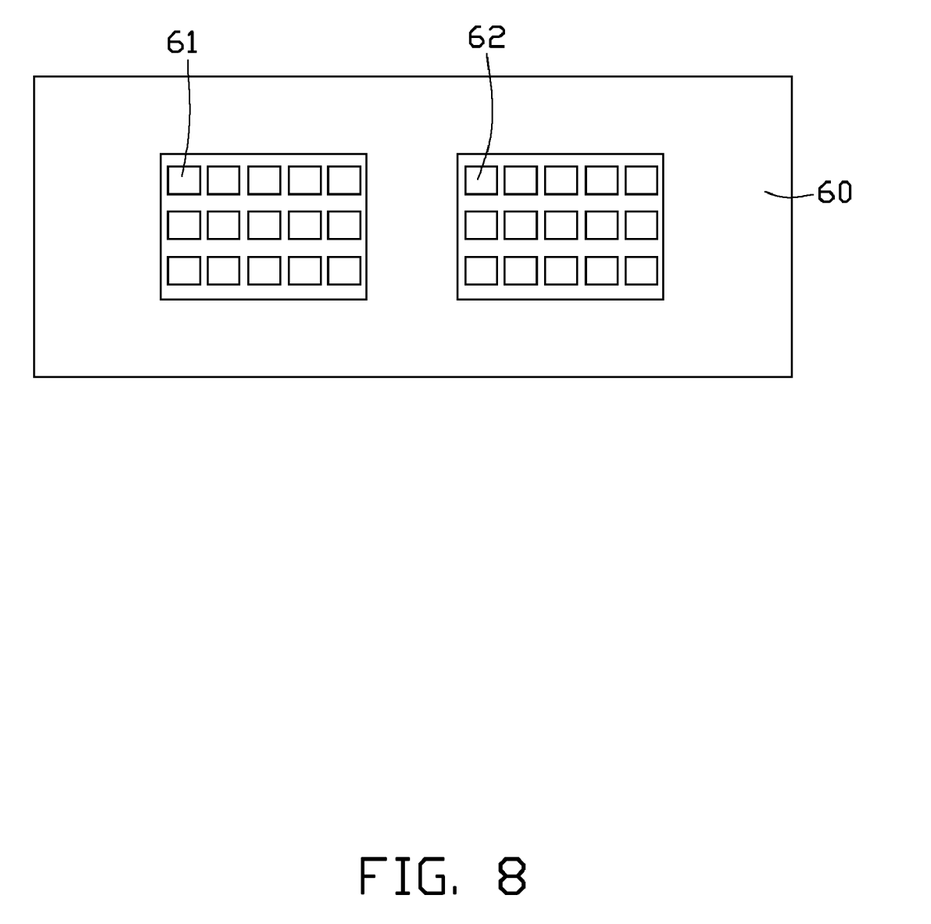
FIG. 8 is a top view showing a solder-applying pattern in accordance with a second embodiment of the present disclosure.

Referring to FIG. 8, a solder-applying pattern 60 in accordance with a second embodiment is provided. The solder-applying pattern 60 includes a plurality of first holes 61 and a plurality of second holes 62. The first holes 61 are cuboid and cooperatively arranged in a matrix structure. The second holes 62 are also cuboid and cooperatively arranged in a matrix structure. The solder-applying pattern 60 can replace the solder-applying pattern 20 in the first embodiment; therefore, the solder pastes 30 can still fill into the first holes 61 and the second holes 62 in the solder-applying pattern 60. Alternatively, the first holes 61 and the second holes 62 can also be other shapes such as trigonal prism or cylinder.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method for soldering a surface mounting LED to a circuit board, comprising following steps:

providing a circuit board, which comprises a first electrode and second electrode electrically insulated from each other;

providing a solder-applying pattern on the first electrode and the second electrode, the solder-applying pattern defining a plurality of first holes above the first electrode and a plurality of second holes above the second electrode, the first holes and the second holes passing through the solder-applying pattern to expose parts of the first electrode and parts of the second electrode respectively;

filling solder pastes into the first holes and the second holes;

separating the solder-applying pattern from the circuit board, the solder paste filled in the first holes forming a plurality of first solder poles, the solder paste filled in the second holes forming a plurality of second solder poles;

providing an LED comprising a positive electrode on the first solder poles and a negative electrode on the second solder poles; and heating the first solder poles and the second solder poles to form a first solder ball and a second solder ball respectively after the heated first and second solder poles are cooled, the first solder ball electrically and mechanically connecting the positive electrode of the LED with the first electrode, the second solder ball electrically and mechanically connecting the negative electrode of the LED with the second electrode.

2. The method of claim 1, wherein the step of filling the solder pastes into the first holes and the second holes comprising depositing the solder pastes on an upper surface of the solder-applying pattern, and pushing the solder pastes along the upper surface of the solder-applying pattern by a squeegee blade until the solder pastes are filled into the first holes and the second holes.

3. The method of claim 2, wherein the squeegee blade is made of plastic.

4. The method of claim 3, wherein an acute angle is formed between a bottom surface of the squeegee blade and the upper surface of the block plate.

5. The method of claim 4, wherein the acute angle is in a range from 15 to 75 degrees.

6. The method of claim 1, wherein the first holes and the second holes have hexagonal prism-shaped.

7. The method of claim 6, wherein the first holes are cooperatively arranged in a honeycomb structure, and the second holes are cooperatively arranged in a honeycomb structure.

8. The method of claim 1, wherein the first holes and the second holes are cuboid and the first holes are cooperatively arranged in a matrix structure and the second holes are cooperatively arranged in a matrix structure.

9. The method of claim 1, wherein the solder pastes are tin or lead solder particles held together within a flux paste.

10. The method of claim 1, wherein the solder-applying pattern is made of steel.

11. The method of claim 10, wherein the first through holes and the second through holes are formed by etching, laser cutting or punching.

* * * * *